United States Patent [19]

Miragliotta

[11] 3,795,023
[45] Mar. 5, 1974

[54] COMBINATION CUTTING, STRIPPING AND SWAGING TOOL

[76] Inventor: Vito Miragliotta, 1184 S. 1000, East, Clearfield, Utah 84015

[22] Filed: Dec. 26, 1972

[21] Appl. No.: 318,116

[52] U.S. Cl. ............................ 7/5.5, 30/90.1, 7/14.1
[51] Int. Cl. ............................ H02g 1/12, B25f 1/00
[58] Field of Search .......... 7/3 R, 5, 4, 5.4, 5.5, 5.6, 7/14 R; 81/9.5 R, 341; 30/90.1

[56] References Cited
UNITED STATES PATENTS

| | | | |
|---|---|---|---|
| 2,697,956 | 12/1954 | Cook, Jr. | 81/9.5 R X |
| 2,721,383 | 10/1955 | Miller | 81/9.5 R |
| 3,046,820 | 7/1962 | Patrick | 81/9.5 R |
| 3,733,627 | 5/1973 | Epstein | 7/5.4 |

*Primary Examiner*—Al Lawrence Smith
*Assistant Examiner*—Roscoe V. Parker

[57] ABSTRACT

A hand operated tool including a pliers type handle operating opposing jaws to which are connected saw like stripping blades for cutting and stripping portions of a coaxial cable, which opposing jaws have adjustable stop means associated therewith for controlling the distance between the stripping blade edges. An arrangement for inserting a coaxial fitting onto the prepared end of a section of coaxial cable is included as part of the tool and comprises a cable holder, operated by movement of the tools opposing jaws, and a fitting coupler, with which a fitting is inserted into the outer covering of the end of a section of coaxial cable, which fitting coupler is operated by a lever pivotally connected to one of the tools pliers type handles.

5 Claims, 6 Drawing Figures

PATENTED MAR 5 1974 3,795,023
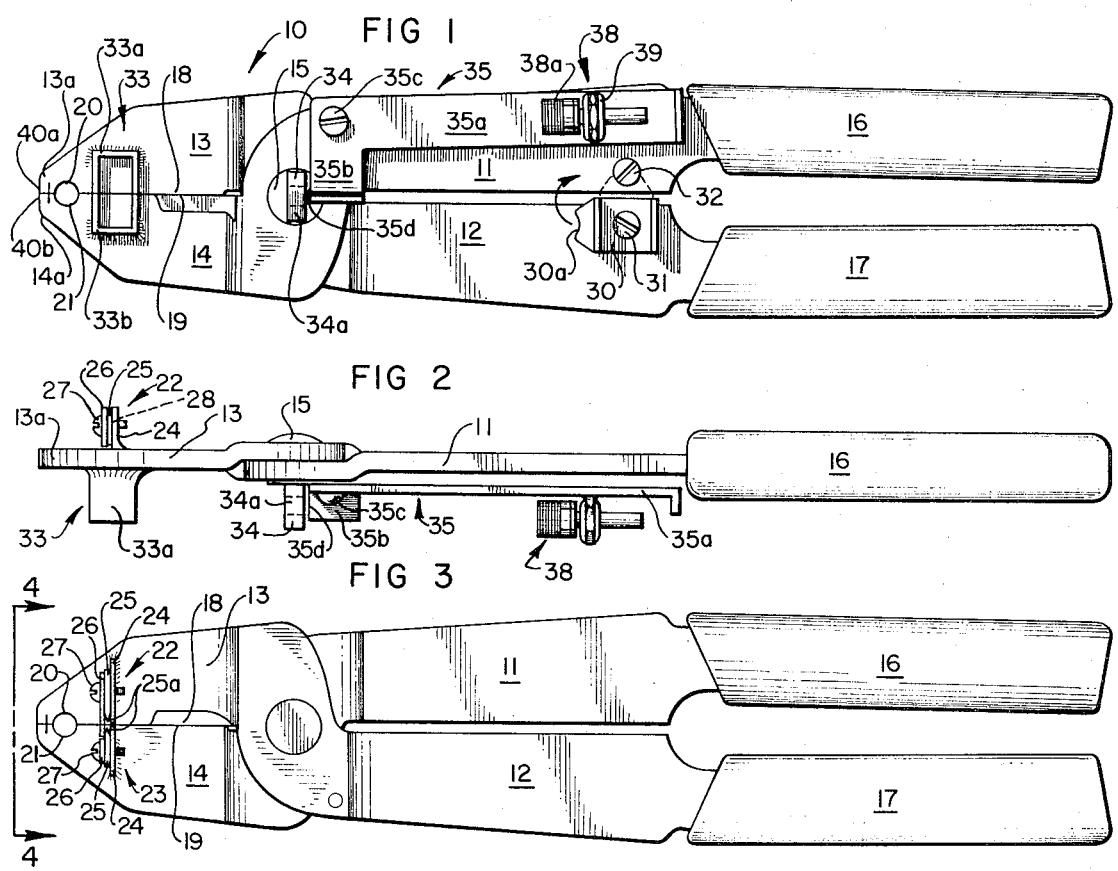
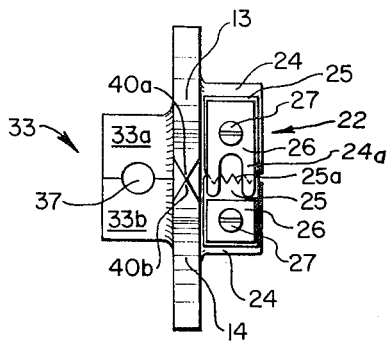
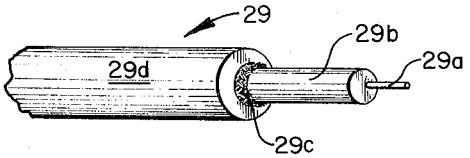
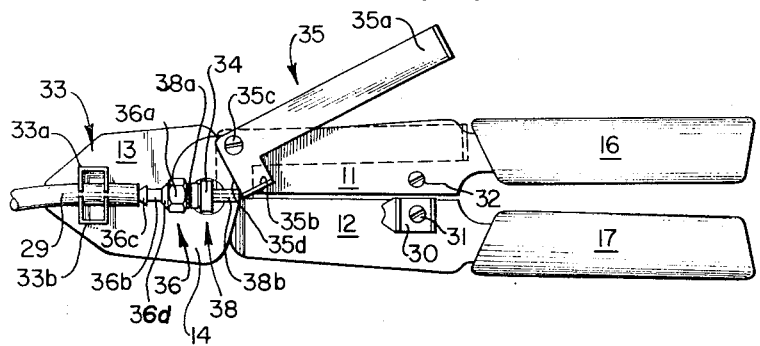

COMBINATION CUTTING, STRIPPING AND SWAGING TOOL

BRIEF DESCRIPTION OF THE INVENTION

1. Field of the Invention

This invention relates to combination tools for performing cutting, stripping, and operations whereby a fitting is attached to the end of a coaxial cable.

2. Prior Art

Numerous hand operated tools for performing cutting and stripping operations to remove insulation from a covered wire are known and in common use. Tools such as that disclosed in U.S. Pat. No. 2,932,224, have also incorporated stop arrangements therewith for limiting the depth of a cut into such a wire or cable. Other variations of stripping tools, such as that disclosed in U.S. Pat. No. 3,046,820, have incorporated multiple blade arrangements for performing cutting and stripping operations, and of course, tools are known that will perform both cutting and crimping operations.

While numerous tools are available that are capable of performing one or even two of the operations of cutting a section of coaxial cable, stripping sections of insulation therefrom, and joining a fitting onto the cable end, no single hand operated tool, to my knowledge, prior to the present invention has been capable of performing all of the aforesaid operations.

SUMMARY OF THE INVENTION

It is the principal object of the present invention to provide a single hand operated tool with which an operator can cut a coaxial cable; can strip away sections of the cable insulation, wire mesh shielding, and, as required, portions of the cable center core, exposing the center wire therein; and can insert and secure an appropriate coaxial fitting onto the cable end beneath the cable insulation.

Principal features of the present invention include a hand operated tool having pliers type handles that are pivotally connected to move opposing jaws thereon into and out of engagement with one another. The opposing jaws have sharp edged blades formed along opposing edges thereof for severing a wire or cable, and additionally have opposing semicircular shaped recesses formed proximate to the ends thereof for crimping a collar around the outer covering of a section of coaxial cable.

A pair of blades each having saw like edges are secured normal to the sides of the opposing jaws such that the blade saw like edges are opposite to one another and will close together when the opposing jaws are pivotally together. A U-shaped guide is arranged with one of the blades that positions a section of coaxial cable in the center area between the blades, and supports the cable while the tool is rotated, allowing a circular cut to be made completely around the cable. A rotatable stop is provided on one of the handles, which stop has a side shaped with a saddle or recess therein. The stop, when turned appropriately, contacts an adjustable post that extends at a normal angle from the other handle, which saddle to post contacts limits the amount of closure of the jaws, thereby controlling the spacing between the saw like cutting blades. The gap distance between the post and the stop saddle is intended to be reflective of the core diameter of a section of a particular size of coaxial cable and can be adjusted by appropriately turning the post, which post is connected off center to the handle. When the stop is rotated such that the stop saddle is out of contact with the adjustable post the saw like cutting blades are arranged to sever through the outer insulation, wire mesh shielding and the center core of the section of coaxial cable, exposing the cable center wire therein. The tool can then be rotated to complete the cut around the entire cable circumference after which tool rotation the severed cable portions can be pulled or stripped therefrom.

A lever formed with a straight hand engaging portion extending at a right angle from a base leg portion, which base leg is pivotally connected to one of the pliers type handles, is provided with the tool of the invention for attaching a coaxial fitting onto the appropriately stripped end of a section of coaxial cable. The lever is formed with a flat face arranged on the foward side of its base leg. A flange is included that projects from the pivotal coupling of the pliers type handles and is formed having a center hole arranged therethrough. The flange is arranged such that the center hole thereof is positioned opposite to the lever flat face so that a shank end of a coaxial fitting die can be fitted therethrough. With the fitting die so arranged, the lever flat face, when the lever is rotated appropriately, contacts the end of the fitting die forcing the fitting die and a coaxial fitting connected thereto into the prepared end of a section of coaxial cable. Cable gripping clamps, arranged to project normally from each of the opposing jaws and come together around a section of coaxial cable to hold the cable therein, align with the center hole in the described flange. The end of a section of coaxial cable held by the closed gripping clamps is thereby positioned to receive, when the level is pivoted appropriately, the cable connecting end of a coaxial fitting.

Crimping jaws are formed on the ends of the opposing jaws for use in crimping a collar around the coaxial cable end that receives the coaxial fitting inserted therein.

Opposing nipping blades are also arranged across from one another in the ends of the pivotally connected opposing jaws and are used to cut insulation, wire, or the like.

Additional objects and features of the invention will become apparent from the following detailed description, taken together with the accompanying drawings.

THE DRAWINGS

FIG. 1 is a side elevation view of the tool of the present invention;

FIG. 2, a top plan view of the tool of FIG. 1;

FIG. 3, a rear elevation view of the tool of FIG. 1;

FIG. 4, a section taken along the line 4—4 of FIG. 3;

FIG. 5, an enlarged segment of coaxial cable showing an end thereof from which portions of insulation, wire mesh shielding, and center core have been removed in preparation for the installation of a coaxial cable fitting thereon; and FIG. 6, a side elevation view like that of FIG. 1 showing the lever aligned with the end of the shank of a die that is connected to a fitting that is aligned into the end of a segment of coaxial cable.

DETAILED DESCRIPTION

Referring now to the drawings:

A combination cutting, stripping and coaxial fitting connection tool 10, hereinafter referred to as tool, is shown in FIGS. 1–4, as having pliers type handles 11 and 12 that have opposing jaws 13 and 14 formed on the ends thereof, which handles are pivotally connected together at 15. Hand grips 16 and 17 are provided to cover the ends of handles 11 and 12 opposite to jaws 13 and 14.

Jaws 13 and 14, FIGS. 1 and 3, have opposing sharp edged blades 18 and 19 formed as portions of the opposite edges thereof. By moving together handles 11 and 12 as by an operator squeezing together the hand grips 16 and 17, the opposing sharp edges of the blades 18 and 19 are moved together. A wire, cable, or the like, that is inserted between the blades 18 and 19, is therefore sheared in two by an operation squeezing together handles 11 and 12.

Opposing crimping jaws 20 and 21 are formed as semicircular recesses also in the jaws 13 and 14 proximate to the ends 13a and 14a thereof. By squeezing hand grips 16 and 17 together, the crimping jaws 20 and 21 are moved together forming a circular opening through the closed jaws. When a locking collar, not shown, is positioned between the crimping jaws, and has the jaws 20 and 21 closed thereover, the collar is squeezed deforming into the shape of the area between the crimping jaws. A locking collar deformed as outlined above, around a section of coaxial cable, squeezes the cable insulation tightly against the cable body to lock a coaxial fitting inserted therebetween to the cable end, as will be explained later herein.

Opposing cable stripping jaws 22 and 23, FIGS. 2–4, are arranged to project outwardly at a normal angle from the sides of jaws 13 and 14. Each cable stripping jaw 22 or 23 consists of a bracket 24 secured to jaws 13 or 14 so as to project outwardly at approximately a right angle therefrom. Each bracket 24 mounts a blade 25, having a saw-like cutting edge 25a formed thereon. The cutting edges 25a of the blades 25 are maintained opposite to one another by blade positioning tabs 26 that are secured and aligned by screws 27 turned through holes 28 into brackets 24.

Cable stripping jaw 22 also includes a U-shaped cable guide 24a, FIG. 4, arranged as part of the positioning tab 26 as a means for maintaining and positioning a section of coaxial cable against and between the blades 25 when the stripping jaws 22 and 23 are closed thereover.

When the jaws 13 and 14 are moved together the stripping jaw blade cutting edges 25a move therewith and come together leaving only a narrow gap, shown in FIG. 3, remaining therebetween when the jaws are fully closed. The gap or distance between cutting edges 25a is intended to reflect the approximate diameter of a center wire 29a of a section of a particular size of coaxial cable 29 FIG. 5 and is of course, adjusted to reflect, as required, a different diameter of center wire, by loosening screws 27 and aligning the blades 25 and positioning tab 26 with respect to the brackets 24. By closing the stripping jaws 22 and 23 over a portion of a coaxial cable 29, and rotating the cable therein, the cable outer insulation 29d, wire mesh shielding 29c, and center core 29b, FIG. 5, are sheared through. The tool 10 can be rotated around the cable 29 to completely sever the cable outer insulation 29d, wwire mesh shielding 29c, and center core 29b, whereafter the severed cable portions can be pulled free or stripped from the center wire 29a.

A stop 30, FIG. 1, is rotatably coupled by a screw 31 to the handle 12 so as to be opposite to an adjustable screw post 32, that is arranged to project normally from the side of the opposite handle 11. When the stop 30 is positioned, as shown in solid lines in FIG. 1, as has been explained, movement of handles 11 and 12 towards one another is not impaired and the gap distance between blades 25a is controlled by the positioning of blades 25 with the positioning tabs 26. When, however, the stop 30 is rotated, as shown by the arrow in FIG. 1, to bring a saddle 30a formed on a side thereof, shown in dotted lines in FIG. 1, into blocking engagement with the adjustable screw post 32, closure together of handles 11 and 12 is blocked. The closure gap between the stripping jaw blade cutting edges 25a with the stop 30 and adjustable screw post 32 engaged, is intended to reflect the diameter of the center core 29b of a coaxial cable 29, FIG. 5, and can be adjusted by turning the screw post 32, which is connected off center to the handle 11, thereby varying the distance from the screw post outer circumference to the stop 30. The gap or closure distance between the edges 25a of the closed blades 25 can thereby be controlled by appropriately positioning of the adjustable screw post 32 with respect to the stop saddle 30a to accommodate a specified diameter of cable center core 29b. Closing the stripping jaws 22 and 23 over the section of coaxial cable 29 with the stop 30 rotated to bring its saddle 30a into contact with the adjustable screw post 32 positions the blade edges 25a to pass through the cable outer indulation 29d, wire mesh shielding 29c, and down to the center core 29b. By then rotating the tool 10, the cut made by blade edges 25a is extended around the section of coaxial cable 29 severing the outer insulation 29d and wire mesh shielding 29c from the cable 29 whereafter the severed portions of the cable 29 can be removed.

Sequentially, the stop 30 is rotated to bring the saddle 30a thereof into alignment with the adjustable screw post 32, and the end of a section of coaxial cable 29 is placed between the stripping blades 25. A scale or other indicia, not shown, may be arranged with the tool jaws 13 and 14 for measuring the amount of cable portions to be positioned between the stripping blade 25. The blades 25 are then moved into the cable 29 severing through the outer insulation 29d and wire mesh shielding 29c thereof, to the center core 29b, after which the tool 10 is rotated with the guide 24a maintaining the cable 29 aligned between the blades 25. The blade edges 25a thereby sever through said cable portions after which the severed portions thereof are pulled or stripped off from the end of cable 29. The stop 30 is then rotated to displace the saddle 30a thereof out of alignment with the screw post 32 and that portion of the exposed cable center core 29b to be stripped is placed beneath blades 25. The blades 25 are rotated together, severing the center core 29b down to the center wire 29a, and the tool 10 is again rotated as described. Whereafter the severed portion of the cable center core 29b is pulled or stripped off from the center wire 29a. The aforesaid operations prepare the cable 29 end to receive a coaxial fitting installed thereon, which fitting installation will be explained in detail later herein.

The coaxial cable fitting installation arrangement of tool 10 consists in part of cable holding clamp 33, composed of clamping jaws 33a and 33b that extend normally from each of the jaws 13 and 14. When the individual clamping jaws are closed together, forming the holding clamp 33, they are aligned with a guide flange 34 that projects outwardly at a right angle from the pivotal connection 15 of handles 11 and 12. A lever 35 is pivotally connected to handle 11 by a screw 35c, FIG. 1, such that movement of a straight hand engaging portion 35a thereof will move a flat face 35d of a base leg portion 35b thereof towards the holding clamp 33. To install a coaxial fitting 36, FIG. 6, onto the end of the section of coaxial cable 29 shown in FIG. 5, the cable 29 is fitted between opposing cable clamping jaws 33a and 33b of the cable holding clamp and the clamping jaws 33a and 33b are moved thereagainst by pivoting together the handles 11 and 12. The clamping jaws 33a and 33b have opposing semicircular openings formed in their opposing edges, which openings when the jaws are brought together, form a circular center opening 37 whose diameter is slightly smaller than is that of the section of coaxial cable 29. The section of cable 29, when fitted between the clamping jaws 33a and 33b, is thereby held securely by the edges of circular opening 37 such that the end of cable 29 is aligned with a center opening 34a in guide flange 34.

A fitting die 38, FIGS. 1 and 6, is provided for use with the tool 10. The fitting die 38 consists of a threaded body portion 38a having a straight shank end 38b projecting outwardly from the end thereof. The die shank end 38b has a diameter that is slightly less than is the diameter of center opening 34a in guide flange 34 and is maintained, when not in use, in a holder 39 that is arranged on one side of lever 35.

To install a coaxial fitting onto the end of coaxial cable 29 the fitting die 38 threaded body portion 38a is turned into the internally threaded nut shaped end portion 36a of a coaxial cable fitting 36, FIG. 6. After coupling together the die 38 and the fitting 36 the straight shank 38b of the fitting die 38 is then inserted through the center opening 34a in the guide flange 34 such that the end thereof is positioned opposite to a flat face 35d on the base leg portion 35b of lever 35. Thereafter, by depressing the end of the hand engaging portion 35a of the lever 35, the flat face 35d is moved into engagement with the end of the die shank 38b, FIG. 6. The die shank 38b is thereby urged to slide within the opening 34a in guide flange 34 towards the cable holding clamp 33 forcing a connecting body 36b end of coaxial cable fitting 36 into engagement with the end of cable 29. The coupling body 36b of coaxial cable fitting 36 is thereby forced beneath the outer installation 29d of the coaxial cable 29 completing an electrical connection between itself and the coaxial cable wire mesh shielding 29c.

The coaxial fitting 36 is preferably of a standard design having a hollow longitudinal center core formed through the nut shaped end portion 36a and connecting body 36b thereof. The hollow core is open at both ends to accommodate the cable center core 29b, fitted therethrough such that the cables center wire 29a extends out from the nut end 36a of the coaxial cable fitting 36. So arranged, the fitting 36 is locked to the end of cable 29 by securing the crimping jaws 20 and 21, as has already been described herein, and a locking ring, not shown, around the cable 29 between an outwardly projecting ridge 36c formed around the end of the connecting body 36b, and a tapered side 36d of the fitting nut end portion 36a that contacts the fitting connecting body 36b.

Additionally, opposing nipper or cutting jaws 40a and 40b, FIGS. 1, 2, and 4, are arranged opposite to one another in the ends 13a and 14a of jaws 13 and 14, as wire or cable insulation cutters.

Although a preferred form of my invention has been herein disclosed, it is to be understood that the present disclosure is made by way of example and that variations are possible without departing from the subject matter coming within the scope of the following claims, which subject matter I regard as my invention.

I claim:

1. A combination cutting, stripping and coaxial fitting connection tool comprising
   a pair of opposing pliers type handles that have opposing jaws formed as ends thereof, which handles are pivotally connected such that movement together of said handles moves together the opposing edges of said opposing jaws;
   a pair of sharp edged blades, each of which is arranged along the opposite edge of each of said opposing jaws such that the sharp edges thereof can be moved into cutting engagement one with the other;
   a pair of stripping jaw means having opposing cutting edges associated therewith which stripping jaw means are secured to said opposing jaws such that moving said opposing jaws together moves together said opposing cutting edges thereof for cutting through an outer portion of a section coaxial cable;

means arranged on said tool for adjusting the amount of closure of said opposing cutting edges of said opposing stripping jaw means;
   opposing clamping means secured to said opposing jaws for holding said section of coaxial cable therebetween; and
   means associated with said tool for inserting the connecting end of a standard coaxial fitting beneath the outer insulation of an appropriately prepared end of said section of coaxial cable while said section of coaxial cable is maintained by said opposing clamping means.

2. A combination cutting, stripping and coaxial fitting connection tool as recited in claim 1, wherein the means associated with said tool for inserting the connecting end of a standard coaxial fitting beneath the outer insulation of an appropriately prepared end of said section of coaxial cable consists of
   a guide flange secured to said tool having an opening formed therethrough that aligns with the appropriately prepared end of said section of coaxial cable maintained by said opposing clamping means;
   a fitting die having one end thereof that is arranged to be releasably secured to an end of said standard coaxial fitting, which die has an opposite shank end secured thereto which shank end is arranged to slide within said opening in said guide flange; and a lever pivotally connected to one of the handles of said tool, having a face formed as one portion thereof that is arranged to be opposite to said opening in said guide flange and to contact, when said lever is pivoted appropriately, the end of said fitting die shank end installed in said opening in said guide flange.

3. A combination cutting, stripping, and coaxial fitting connection tool as recited in claim 1, further including a pair of crimping jaws, each formed so as to be opposite to one another in each of the opposing jaw edges.

4. A combination cutting, stripping, and coaxial fitting connection tool as recited in claim 1, wherein the means for controlling the amount of closure of said opposing cutting edges of said opposing stripping jaw means consists of a rotatable stop pivotally connected to extend outwardly from one of said pliers type handles;

a post connected to extend outwardly from the other said pliers type handle and to be opposite to so as to come into contact with said rotatable stop when said stop is properly positioned and said pliers type handles are moved towards each other.

5. A combination cutting, stripping, and coaxial fitting connection tool as recited in claim 4, wherein the post is connected off center to said pliers type handle, such that rotation of said post alters the distance from said post outer circumference to the stop.

* * * * *